(12) United States Patent
Ning et al.

(10) Patent No.: US 12,358,101 B2
(45) Date of Patent: Jul. 15, 2025

(54) CLAMPING DEVICE AND SANDBLASTING DEVICE FOR AUTOMOBILE PART PROCESSING

(71) Applicant: Zhejiang Wanli University, Zhejiang (CN)

(72) Inventors: Jingwei Ning, Zhejiang (CN); Xiang Yan, Zhejiang (CN); Wen Liu, Zhejiang (CN); Hongwei Cui, Zhejiang (CN); Hang Wang, Zhejiang (CN); Chi Zhang, Zhejiang (CN); Li Lin, Zhejiang (CN); Peichao Wang, Zhejiang (CN); Yeying Teng, Zhejiang (CN)

(73) Assignee: Zhejiang Wanli University, Ningbo (CN)

( * ) Notice: Subject to any disclaimer, the term of this patent is extended or adjusted under 35 U.S.C. 154(b) by 321 days.

(21) Appl. No.: 17/970,344

(22) Filed: Oct. 20, 2022

(65) Prior Publication Data
US 2024/0009807 A1    Jan. 11, 2024

(30) Foreign Application Priority Data
Jul. 7, 2022   (CN) .......................... 202210802104.9

(51) Int. Cl.
*B24C 9/00*    (2006.01)
*B24C 3/32*    (2006.01)

(52) U.S. Cl.
CPC . *B24C 9/00* (2013.01); *B24C 3/32* (2013.01)

(58) Field of Classification Search
CPC ........... B25B 5/006; B25B 5/02; B25B 5/068; B23Q 3/02; B23Q 3/06; B23Q 3/065; B23Q 3/103; B24C 3/32; B24C 9/00; B24B 41/06; B23P 19/02
USPC .............. 451/75, 365, 378, 434, 439; 269/6, 269/254 R, 157, 97, 254 CS, 43, 156; 29/559
See application file for complete search history.

(56) References Cited

FOREIGN PATENT DOCUMENTS

| CN | 215148210 U | * 12/2021 |
|---|---|---|
| CN | 215319988 U | * 12/2021 |

OTHER PUBLICATIONS

Machine translation of CN-215148210-U (Year: 2021).*
Machine translation of CN-215319988-U (Year: 2021).*

* cited by examiner

*Primary Examiner* — Robert F Neibaur

(57) ABSTRACT

The present disclosure relates to the technical field of automobile part processing, and specifically provides a clamping device and a sandblasting device for automobile part processing. The clamping device comprises a clamping component for clamping an automobile part, and an auxiliary component; the auxiliary component comprises a supporting part, a pull rod, a protective pad, and a return spring, wherein the pull rod is movably provided on the supporting part, one end of the pull rod is connected to the protective pad having deformation performance, and the protective pad is used for being arranged between the automobile part and the clamping component; the return spring is used for being installed between the supporting part and the protective pad; the pull rod is pulled so that the pull rod pulls the protective pad to move towards the direction close to the supporting part.

13 Claims, 3 Drawing Sheets

CLAMPING DEVICE AND SANDBLASTING DEVICE FOR AUTOMOBILE PART PROCESSING

CROSS-REFERENCE TO RELATED APPLICATION

This application claims priority from the Chinese patent application 202210802104.9 filed Jul. 7, 2022, the content of which is incorporated herein in the entirety by reference.

TECHNICAL FIELD

The present disclosure relates to the technical field of automobile part processing, and more particularly to a clamping device and a sandblasting device for automobile part processing.

BACKGROUND ART

In the prior art, in the production of automobile parts, it is often necessary to sandblast and paint the finished semi-finished workpiece.

At present, for the sandblasting operation of automobile parts, the automobile parts are fixed by a clamp in a sandblasting chamber, and then the automobile parts are sandblasted. In the process of sandblasting relatively small automobile parts, the spraying material is usually sprayed on the surface of a fixture, not only causing waste, but also contaminating the working environment.

SUMMARY

The present disclosure is directed at solving at least one aspect of the above technical problems.

In order to solve the above-mentioned problem, the present disclosure proposes the following technical solution:
  a clamping device comprising a clamping component for clamping an automobile part and an auxiliary component; wherein
  the auxiliary component comprises a supporting part, a pull rod, a protective pad, and a reset spring, wherein the pull rod is movably provided on the supporting part, one end of the pull rod is connected to the protective pad having deformation performance, and the protective pad is used to be arranged between the automobile part and the clamping component; the return spring is used for being installed between the supporting part and the protective pad;
  when the pull rod moves between the protective pad and the supporting part, the pull rod drives the protective pad to squeeze the return spring, or the protective pad restores an original shape by the return action of the return spring;
  a through hole is provided on the supporting part, the pull rod is used for being slidingly provided on the supporting part through the through hole, and an outer wall of one end of the pull rod close to the clamping component is sleeved with the return spring.

The present disclosure provides a clamping device and a sandblasting device for automobile part processing, which have the following advantageous effects compared with the prior art, but are not limited thereto:
  the clamping component clamps the automobile parts, and the sandblasting operation is performed on the automobile parts by the sandblasting apparatus; when the surface of the clamping component is adhered with the spraying material, the pull rod is pulled, and the through hole has a guiding effect on the pull rod, so that the pull rod pulls the protective pad to move towards the direction close to the supporting part, and the protective pad deforms, and the return spring is squeezed; then the external force on the pull rod is removed, and the return spring returns, so that the protective pad returns and restores to the original shape; in this process, when the pull rod is pulled, the pull rod can be rotated at the same time, so that the protective pad also rotates; in the process of returning the return spring, the protective pad returns to the original shape, and the protective pad moves in the direction of the clamping component and simultaneously rotates to return, thereby achieving the situation that the protective pad strikes the surface of the clamping component, so that the spraying material on the surface of the clamping component falls off; when the pull rod is pulled, the pull rod can be rotated at the same time, and this operation helps to expand the striking range of the protective pad, thereby helping to improve the falling-off effect of the spraying material on the surface of the clamping component.

Preferably, the clamping component comprises an adjusting bracket, and a first clamping frame and a second clamping frame of the same structure; a clamping groove matching the automobile part is formed between the first clamping frame and the second clamping frame;
  the adjusting bracket is used for adjusting the first clamping frame and the second clamping frame to be close to or apart from each other.

Preferably, the first clamping frame comprises a clamping groove part and an adjusting end; the adjusting end is used for being connected to the adjusting bracket, and the adjusting bracket drives the first clamping frame and the second clamping frame to move via the adjusting end;
  when the adjusting bracket drives the first clamping frame and the second clamping frame to be close to each other, the clamping groove part of the first clamping frame and the clamping groove part of the second clamping frame enclose to form the clamping groove adapted to the automobile part.

Preferably, a movable groove communicating with the clamping groove is provided between the adjusting end of the first clamping frame and the adjusting end of the second clamping frame, the pull rod moves in the movable groove, one end of the pull rod close to the clamping groove is connected to the protective pad, and the protective pad is used for being provided against a surface of the clamping groove.

Preferably, the clamping device also includes a carrier and a driving motor. The clamping component and the auxiliary component are both provided on the carrier, and the driving motor is used to drive the carrier to rotate.

Preferably, one end of the pull rod away from the is provided with a handle located on one side of the supporting part away from the protective pad, the size of the handle being larger than the size of the through hole.

The present disclosure also provides a sandblasting device for automobile part processing, comprising the clamping device as described above.

Preferably, the sandblasting device for automobile part processing further comprises a box body and a support plate. The support plate is obliquely provided at the lower end of the inner top surface of the box body, and the clamping device is used for being provided on the support plate.

Preferably, the sandblasting device for automobile part processing further comprises a skin. Multiple skins are provided respectively provided on one side of the support plate for installing the clamping device, the inner top surface of the box body, and the inner side wall of the box body.

Preferably, the sandblasting device for automobile part processing further comprises an air compression device, and a skin air passage is connected to the outer side of the skin, and the skin is connected to the air compression apparatus via the skin air passage.

The sandblasting device for automobile part processing has the same advantages over the prior art as the above-mentioned clamping device and thus will not be described in detail herein.

Figure 1:
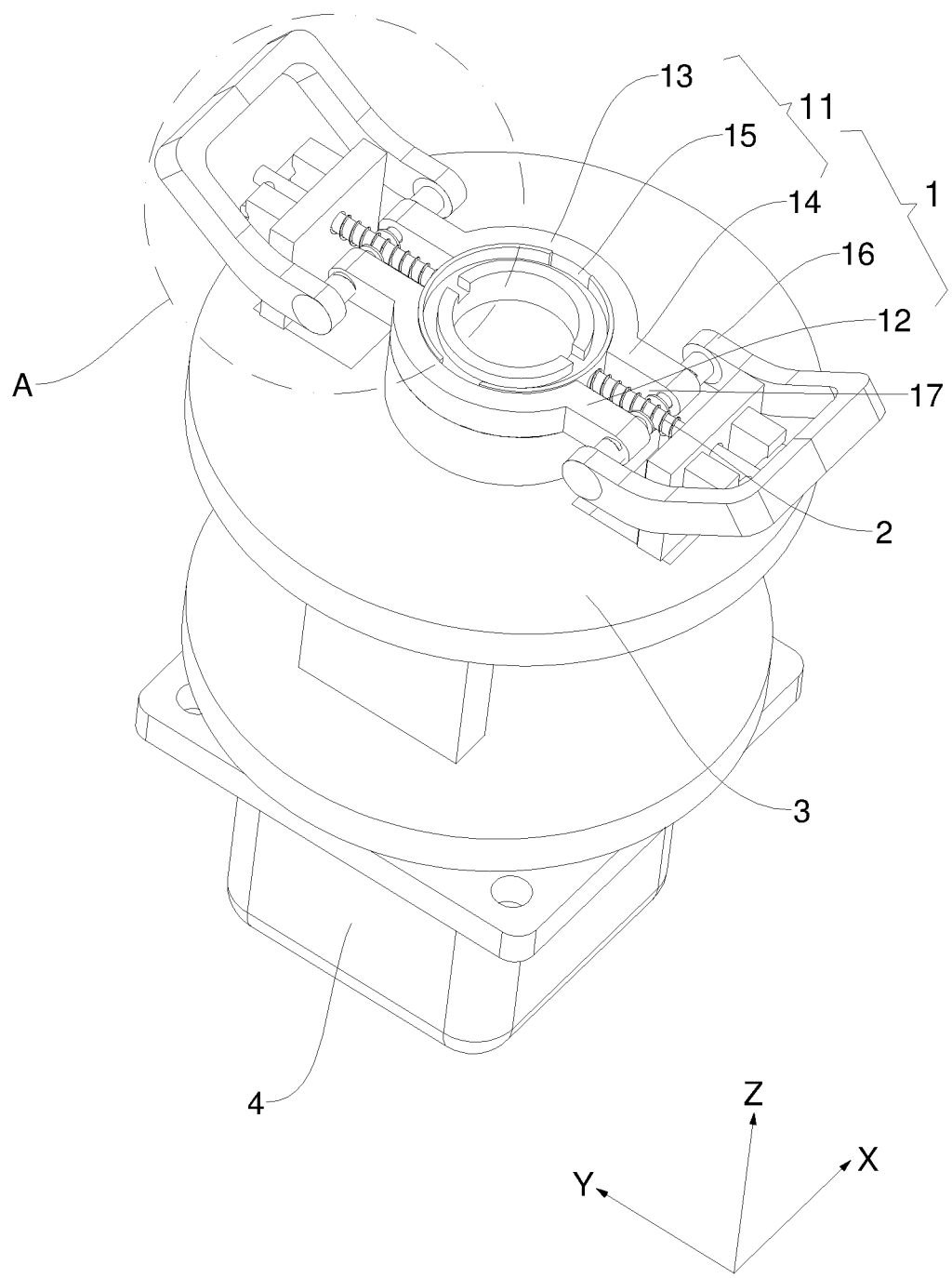
FIG. 1 is a schematic view showing a structure of a clamping device according to the present disclosure.

DESCRIPTION OF REFERENCE NUMERALS 1 clamping component, 11 first clamping frame, 12 second clamping frame, 13 clamping groove part, 14 adjusting end, 15 clamping groove, 16 adjusting bracket, 17 movable groove, 2 auxiliary component, 21 supporting part, 22 pull rod, 23 protective pad, 24 return spring, 25 through hole, 26 handle, 3 carrier, 4 driving motor, 5 box body, 6 support plate, 7 skin, 8 air compression apparatus, and 9 dust collecting net.

DETAILED DESCRIPTION OF THE DISCLOSURE

The implementation mode of the present application is described in further detail below with reference to the accompanying drawings and embodiments. The following embodiments are illustrative of the present application but are not intended to limit the scope thereof.

In the description of the present disclosure, it is to be understood that the orientation or positional relationships indicated by the terms "up", "down", "front", "rear", "left", "right", etc. are based on the orientation or positional relationship shown in the drawings, and are only for the convenience of describing the disclosure and simplifying the description, rather than indicating or implying that the referred device or element must have a specific orientation, or be constructed and operated in a specific orientation, and therefore cannot be construed as a limitation of the present disclosure.

It needs to be noted that in the coordinate system XYZ provided herein, the forward direction of the X axis represents right, the reverse direction of the X axis represents left, the forward direction of the Y axis represents front, the reverse direction of the Y axis represents rear, the forward direction of the Z axis represents above, and the reverse direction of the Z axis represents below; the Z-axis, X-axis, and Y-axis are meant only to facilitate the description of the present disclosure and to simplify the description, and do not indicate or imply that the device or element being referred to must have a particular orientation or be constructed and operated in a particular orientation, and therefore should not be construed as limiting the disclosure.

Figure 2:
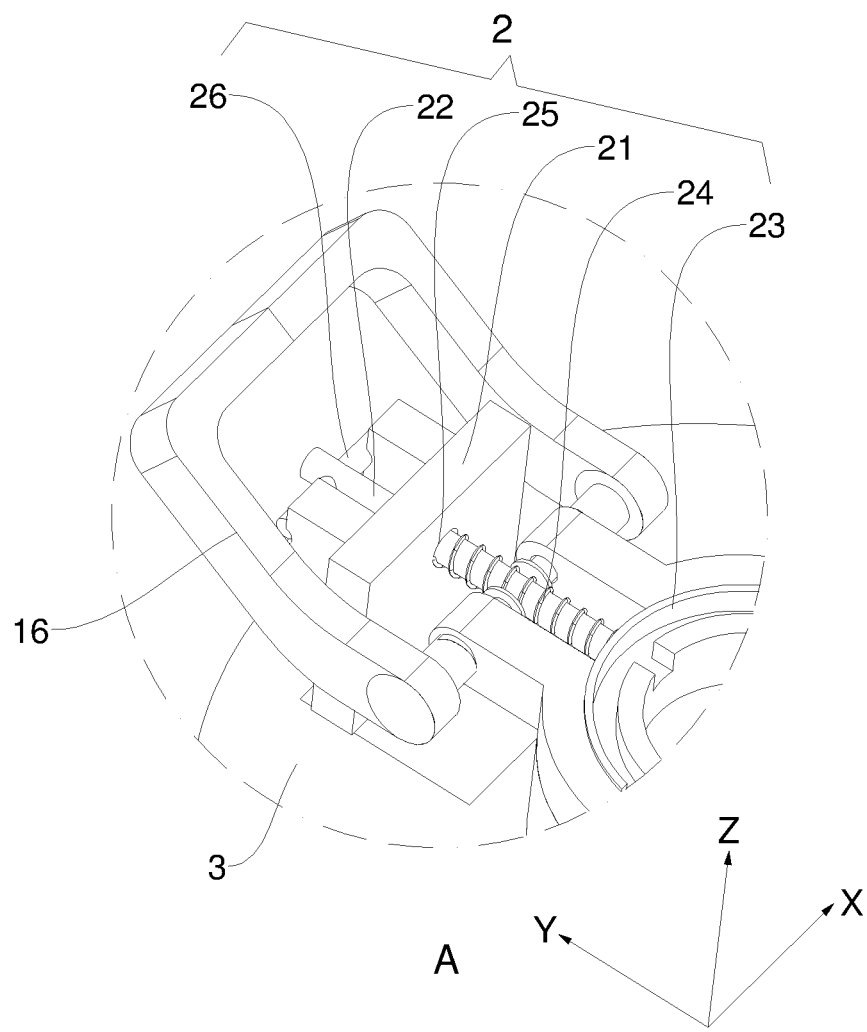
FIG. 2 is a partially enlarged schematic view at A in FIG. 1 of the present disclosure.

Referring to FIGS. 1-2, the present disclosure provides a clamping device comprising a clamping component 1 for clamping an automobile part and an auxiliary member 2;

with reference to FIG. 2, the auxiliary component 2 comprises a supporting part 21, a pull rod 22, a protective pad 23, and a return spring 24; the pull rod 22 is movably arranged on the supporting part 21, one end of the pull rod 22 is connected to the protective pad 23 having deformation performance, and the protective pad 23 is used to be arranged between the automobile part and the clamping component 1; the return spring 24 is used to be installed between the supporting part 21 and the protective pad 23;

when the pull rod 22 moves between the protective pad 23 and the supporting part 21, the pull rod 22 drives the protective pad 23 to squeeze the return spring 24, or the protective pad 23 returns to the original shape by the return action of the return spring 24;

a through hole 25 is provided on the supporting part 21, the pull rod 22 is used for being slidingly provided on the supporting part 21 through the through hole 25, and the outer wall of one end of the pull rod 22 close to the clamping component 1 is sleeved with the return spring 24.

Specifically, both ends of the return spring 24 are not connected to the supporting part 21 and the protective pad 23 so that the pull rod 22 can be rotated.

The present disclosure provides a clamping device having, but not limited to, the following advantages over the prior art.

The clamping component clamps the automobile parts, and the sandblasting operation is performed on the automobile parts by the sandblasting apparatus; when the surface of the clamping component is adhered with the spraying material, the pull rod is pulled, and the through hole 25 has a guiding effect on the pull rod, so that the pull rod pulls the protective pad to move towards the direction close to the supporting part, and the protective pad deforms, and the return spring is squeezed; then the external force on the pull rod is removed, and the return spring returns, so that the protective pad returns and restores to the original shape; in this process, when the pull rod 22 is pulled, the pull rod 22 can be rotated at the same time, so that the protective pad 23 also rotates; in the process of returning the return spring 24, the protective pad 23 returns to the original shape, and the protective pad 23 moves in the direction of the clamping component 1 and simultaneously rotates to return, thereby achieving the situation that the protective pad 23 strikes the surface of the clamping component 1, so that the spraying material on the surface of the clamping component 1 falls off; when the pull rod 22 is pulled, the pull rod 22 can be rotated at the same time, and this operation helps to expand the striking range of the protective pad 23, thereby helping to improve the falling-off effect of the spraying material on the surface of the clamping component 1.

In other embodiments, the return spring 24 is provided between the supporting part 21 and the protective pad 23 at one side near the pull rod 22, which is different from the return spring 24 being sleeved on the pull rod 22, and two ends of the return spring 24 are respectively connected to the supporting part 21 and the protective pad 23; the return spring 24 in this position still provides a striking action on the surface of the clamping component when it is returned.

Preferably, the clamping component 1 comprises an adjusting bracket 16, and a first clamping frame 11 and a second clamping frame 12 of the same structure; a clamping groove 15 matching the automobile part is formed between the first clamping frame 11 and the second clamping frame 12;

the adjusting bracket 16 is used for adjusting the first clamping frame 11 and the second clamping frame 12 to be close to or apart from each other.

In the present embodiment, when the adjusting bracket 16 is adjusted so that the distance between the first clamping frame 11 and the second clamping frame 12 is farther away, the distance between the first clamping frame 11 and the second clamping frame 12 is relatively loose, so as to facilitate the installation of automobile parts; when the adjusting bracket 16 is adjusted so that the first clamping frame 11 and the second clamping frame 12 are closer, the first clamping frame 11 and the second clamping frame 12 are in a clamped state there between, so as to facilitate the clamping of the clamping component 1 on the automobile part and facilitate the sandblasting operation of the sandblasting assembly 2.

Preferably, the first clamping frame 11 comprises a clamping groove part 13 and an adjusting end 14; the adjusting end 14 is used for being connected to the adjusting bracket 16, and the adjusting bracket 16 drives the first clamping frame 11 and the second clamping frame 12 to move via the adjusting end 14;

with reference to FIG. 1, when the adjusting bracket 16 drives the first clamping frame 11 and the second clamping frame 12 to be close to each other, the clamping groove part 13 of the first clamping frame 11 and the clamping groove part 13 of the second clamping frame 12 enclose to form the clamping groove 15 adapted to the automobile part.

Specifically, the first clamping frame 11 and the second clamping frame 12 can be integrally formed, one end of the first clamping frame 11 has the adjusting end 14, the other end of the first clamping frame 11 has the clamping groove part 13, the clamping groove part 13 of the first clamping frame 11 and the clamping groove part 13 of the second clamping frame 12 are integrally connected and enclose to form a clamping groove 15, and the adjusting bracket 16 is respectively connected to the adjusting end 14 of the first clamping frame 2 and the adjusting end 14 of the second clamping frame 12; when the adjusting bracket 16 drives the first clamping frame 11 and the second clamping frame 12 to be close to each other, namely, when the adjusting end 14 of the first clamping frame 2 and the adjusting end 14 of the second clamping frame 12 approach each other, the size of a clamping groove 15 formed by enclosing the clamping groove part 13 of the first clamping frame 11 and the clamping groove part 13 of the second clamping frame 12 decreases, so as to facilitate clamping the automobile parts.

In the present embodiment, the first clamping frame 11 and the second clamping frame 12 are integrally formed so as not only to realize the clamping function, but also to facilitate a simplified structure.

Alternatively, the structure of the first clamping frame 11 may also be such that two ends of the clamping groove part 13 are respectively provided with the adjusting ends 14. Accordingly, two adjusting brackets 16 are provided, and the two adjusting brackets 16 are respectively connected to the adjusting ends 14 at two ends of the first clamping frame 11 and the adjusting ends 14 at two ends of the second clamping frame 12.

In the present embodiment, two ends of the first clamping frame 11 and the second clamping frame 12 are adjusted so as to enhance the clamping action of the clamping component 1 on the automobile parts and the stability of the clamping, and to prevent the clamping component 1 from being easily loosened when clamping the automobile parts.

Referring to FIG. 2, preferably, a movable groove 17 communicating with the clamping groove 15 is provided between the adjusting end 14 of the first clamping frame 11 and the adjusting end 14 of the second clamping frame 12, the pull rod 22 moves in the movable groove 17, one end of the pull rod 22 near the clamping groove 15 is connected to the protective pad 23, and the protective pad 23 is provided to abut against the surface of the clamping groove 15.

In particular, the shape of the clamping groove 15 is preferably provided as a circle, or the shape of the clamping groove 15 may also be various shapes of a triangle, a rectangle, or a combination thereof, and the shape of the protective pad 23 is adapted to the shape of the clamping groove 15;

the material of the protective pad 23 is a rubber pad or a silica gel pad.

In the present embodiment, the movable groove 17 not only provides a movable space for the pull rod 22, but also facilitates the deformation of the protective pad 23, and the pull rod 22 pulls the protective pad 23 to move in the movable groove 17, and the protective pad 23 enters the movable groove 17 from the clamping groove 15 and is squeezed by the movable groove 17. In addition, the pulling of the pull rod 22 makes the protective pad 23 deform within a certain range.

Referring to FIG. 1, preferably, the clamping device also includes a carrier 3 and a driving motor 4. The clamping component 1 and the auxiliary component 2 are both provided on the carrier 3, and the driving motor 4 is used to drive the carrier 3 to rotate.

Specifically, the carrier 3 is provided at the tail end of a driving rod of the driving motor 4.

In the present embodiment, the driving motor 4 drives the carrier 3 to rotate, the clamping component 1 and the auxiliary component 2 are both located on the carrier 3, the clamping component 1 is used for clamping the automobile parts, the driving motor 4 drives the automobile parts to rotate so as to facilitate the sandblasting operation of the sandblasting assembly 2 on the automobile parts in an all-around way, and the driving motor 4 rotates uniformly, which is beneficial to enabling the automobile parts to be uniformly sandblasted.

Preferably, one end of the pull rod 22 away from the 1 is provided with a handle 26 located on one side of the supporting part 21 away from the protective pad 23, the size of the handle 26 being larger than the size of the through hole 25.

In this embodiment, the handle 26 is provided to facilitate the user to pull the pull rod 22, and to help prevent the pull rod 22 from falling out of the through hole 25 and losing the support of the supporting part 21.

Figure 3:
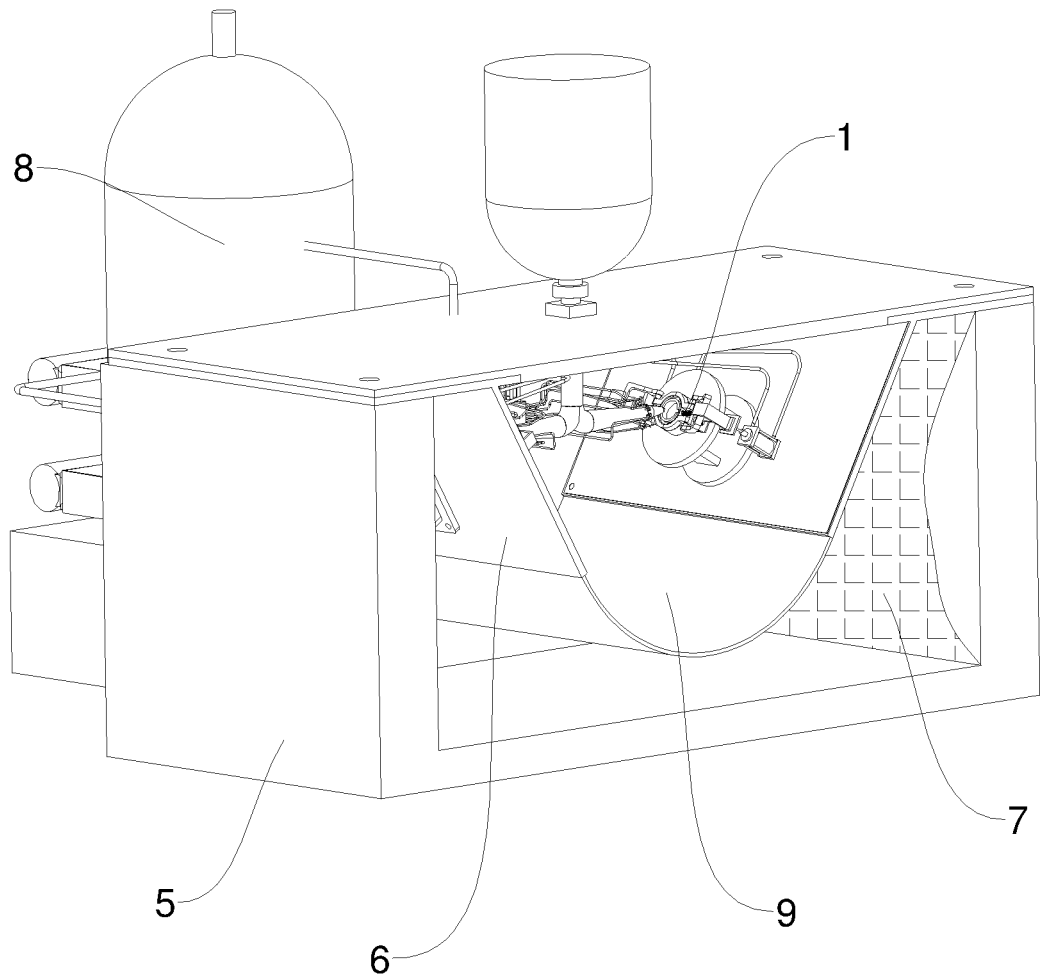
FIG. 3 is a schematic view showing an overall structure of the present disclosure.

Referring to FIG. 3, the present disclosure also provides a sandblasting device for automobile part processing, comprising the clamping device as described above.

Preferably, the sandblasting device for automobile part processing further comprises a box body 5 and a support plate 6. The support plate 6 is obliquely provided at the lower end of the inner top surface of the box body 5, and the clamping device is used for being provided on the support plate 6.

Specifically, a sandblasting apparatus is provided in the box body for sandblasting the automobile parts on the clamping device 1.

In the present embodiment, the box body 5 is provided so as to reduce the range during which the spraying material is ejected in the sandblasting operation, the support plate 6 provides an installing carrier for the clamping device 1, and the support plate 6 is inclined so as to facilitate the spraying material falling on the support plate 6 to fall along the support plate 6 so as to avoid contaminating the support plate 6.

Preferably, the sandblasting device for automobile part processing further comprises a skin 7. Multiple skins 7 are provided respectively provided on one side of the support plate 6 for installing the clamping device 1, the inner top surface of the box body 5, and the inner side wall of the box body 5.

In the present embodiment, a skin 7 is provided for the spraying material attached to the inside of the box body 5 and the spraying material attached to the support plate 6, the spraying material will be attached to the skin 7, and the skin 7 is driven to shake, so as to make the spraying material on the skin 7 vibrate and fall off, thereby reducing the pollution of the support plate 6 and the box body 5.

Preferably, the sandblasting device for automobile part processing further comprises an air compression device 8, and a skin air passage is connected to the outer side of the skin 7, and the skin 7 is connected to the air compression apparatus 8 via the skin air passage.

In the present embodiment, the air compression apparatus 8 can be controlled to agitate the skin 7 through the skin air passage with respect to the spraying material attached to the inside of the box body 5 and the spraying material attached to the support plate 6, and the spraying material on the skin 7 is vibrated and shaken off to reduce the contamination of the support plate 6 and the box body 5.

Specifically, a dust collecting net 9 is provided at the inner bottom of the box body.

In the present embodiment, the spraying material shaken off from the support plate 6 and the spraying material dropped by hitting the clamping component 1 by the auxiliary member 2 fall into the dust collecting net 9, and the dust collecting net 9 collects the spraying material to facilitate recycling and avoid the waste of the spraying material.

The sandblasting device for automobile part processing has the same advantages over the prior art as the above-mentioned clamping device and thus will not be described in detail herein.

Although the present disclosure is disclosed above, the scope of the present disclosure is not limited thereto. Various changes and modifications may be effected by one skilled in the art without departing from the spirit and scope of the disclosure, and it is intended that such changes and modifications fall within the scope of the present disclosure.

The invention claimed is:

1. A clamping device, comprising a clamping component (1) and an auxiliary member (2), the clamping component (1) being used for clamping an automobile part; wherein the auxiliary member (2) comprises a supporting part (21), a pull rod (22), a protective pad (23), and a return spring (24), wherein the pull rod (22) is movably provided on the supporting part (21), one end of the pull rod (22) is connected to the protective pad (23), and the protective pad (23) is used to be provided between the automobile part and the clamping component (1); the return spring (24) is used for being installed between the supporting part (21) and the protective pad (23);

when the pull rod (22) moves between the protective pad (23) and the supporting part (21), the pull rod (22) drives the protective pad (23) to squeeze the return spring (24), or the protective pad (23) restores an original shape by return action of the return spring (24); and a through hole (25) is provided on the supporting part (21), the pull rod (22) is used for being slidingly provided on the supporting part (21) through the through hole (25), and an outer wall of an end portion of the pull rod (22) that is between the through hole and the clamping component (1) is sleeved with the return spring (24), wherein the clamping component (1) comprises an adjusting bracket (16), a first clamping frame (11) and a second clamping frame (12) are of a same structure, and a clamping groove (15) adapted to the automobile part is formed between the first clamping frame (11) and the second clamping frame (12);

each of the first clamping frame (11) and the second clamping frame (12) comprises a clamping groove part (13); and wherein each of the first clamping frame (11) and the second clamping frame comprises an adjusting end (14), the adjusting end (14) being used for connecting with the adjusting bracket (16), and the adjusting bracket (16) driving the first clamping frame (11) and the second clamping frame (12) to move via the adjusting end (14), when the adjusting bracket (16) drives the first clamping frame (11) and the second clamping frame (12) towards each other, the clamping groove part (13) of the first clamping frame (11) and the clamping groove part (13) of the second clamping frame (12) enclose to form the clamping groove (15) adapted to the automobile part.

2. The clamping device according to claim 1, wherein the clamping component (1) further comprises the adjusting bracket (16) is used for adjusting the first clamping frame (11) and the second clamping frame (12) to be moved towards or away from each other.

3. The clamping device according to claim 2, wherein a movable groove (17) communicating with the clamping groove (15) is provided between the adjusting end (14) of the first clamping frame (11) and the adjusting end (14) of the second clamping frame (12), the pull rod (22) moves in the movable groove (17), one end of the pull rod (22) extending towards—the clamping groove (15) is connected to the protective pad (23), and the protective pad (23) is used for being provided against a surface of the clamping groove (15).

4. The clamping device according to claim 2, further comprising a carrier (3) and a driving motor (4), wherein the clamping component (1) and the auxiliary member (2) are both arranged on the carrier (3), and the driving motor (4) is used for driving the carrier (3) to rotate.

5. The clamping device according to claim 1, wherein one end of the pull rod (22) away from the clamping component (1) is provided with a handle (26), the handle (26) is located on one side of the supporting part (21) away from the protective pad (23), and a size of the handle (26) is larger than that of the through hole (25).

6. A sandblasting device for automobile part processing, comprising a clamping device comprising a clamping component (1) and an auxiliary member (2), the clamping component (1) being used for clamping an automobile part; wherein the auxiliary member (2) comprises a supporting part (21), a pull rod (22), a protective pad (23), and a return spring (24), wherein the pull rod (22) is movably provided on the supporting part (21), one end of the pull rod (22) is connected to the protective pad (23), and the protective pad

(23) is used to be provided between the automobile part and the clamping component (1); the return spring (24) is used for being installed between the supporting part (21) and the protective pad (23);

when the pull rod (22) moves between the protective pad (23) and the supporting part (21), the pull rod (22) drives the protective pad (23) to squeeze the return spring (24), or the protective pad (23) restores an original shape by return action of the return spring (24); and a through hole (25) is provided on the supporting part (21), the pull rod (22) is used for being slidingly provided on the supporting part (21) through the through hole (25), and an outer wall of an end portion of the pull rod (22) that is between the through hole and the clamping component (1) is sleeved with the return spring (24); and further comprising a box body (5) and a support plate (6), wherein the support plate (6) is obliquely provided at a lower end of an inner top surface of the box body (5), and the clamping device is used for being provided on the support plate (6).

7. The sandblasting device for automobile part processing according to claim 6, further comprising a skin (7), wherein multiple skins (7) are provided to be respectively used for being provided on one side of the support plate (6) for installing the clamping device, the inner top surface of the box body (5), and an inner side wall of the box body (5).

8. The sandblasting device for automobile part processing according to claim 7, further comprising an air compression apparatus (8), wherein an outer side of the skin (7) is connected with a skin air passage, the skin (7) being connected with the air compression apparatus (8) through the skin air passage.

9. The sandblasting device of claim 6, wherein the clamping component (1) comprises the adjusting bracket (16), and a first clamping frame (11) and a second clamping frame (12) of the same structure, and the clamping groove (15) adapted to the automobile part is formed between the first clamping frame (11) and the second clamping frame (12); and the adjusting bracket (16) is used for adjusting the first clamping frame (11) and the second clamping frame (12) to be moved towards or away from each other.

10. The sandblasting device of claim 9, wherein the first clamping frame (11) comprises the clamping groove part (13) and an adjusting end (14), the adjusting end (14) being used for connecting with the adjusting frame (16), and the adjusting frame (16) driving the first clamping frame (11) and the second clamping frame (12) to move via the adjusting end (14); and when the adjusting bracket (16) drives the first clamping frame (11) and the second clamping frame (12) towards each other, the clamping groove part (13) of the first clamping frame (11) and the clamping groove part (13) of the second clamping frame (12) enclose to form the clamping groove (15) adapted to the automobile part.

11. The sandblasting device of claim 10, wherein the movable groove (17) communicating with the clamping groove (15) is provided between the adjusting end (14) of the first clamping frame (11) and the adjusting end (14) of the second clamping frame (12), the pull rod (22) moves in the movable groove (17), one end of the pull rod (22) extending towards the clamping groove (15) is connected to the protective pad (23), and the protective pad (23) is used for being provided against the surface of the clamping groove (15).

12. The sandblasting device of claim 10, further comprising the carrier (3) and the driving motor (4), wherein the clamping component (1) and the auxiliary member (2) are both arranged on the carrier (3), and the driving motor (4) is used for driving the carrier (3) to rotate.

13. The sandblasting device of claim 6, wherein one end of the pull rod (22) away from the clamping component (1) is provided with the handle (26), the handle (26) is located on one side of the supporting part (21) away from the protective pad (23), and a size of the handle (26) is larger than that of the through hole (25).

\* \* \* \* \*